United States Patent [19]
Wasilewski et al.

[11] Patent Number: 5,988,139
[45] Date of Patent: Nov. 23, 1999

[54] METHOD AND APPARATUS FOR CONTROLLING AN INTERNAL COMBUSTION ENGINE

[75] Inventors: Kurt J. Wasilewski, Oshkosh; John M. Griffiths; Ronald L. Hall, both of Fond du Lac, all of Wis.

[73] Assignee: Brunswick Corporation, Lake Forest, Ill.

[21] Appl. No.: 09/203,785

[22] Filed: Dec. 2, 1998

[51] Int. Cl.[6] .................................................. F02M 3/00
[52] U.S. Cl. ................................. 123/339.11; 123/339.16
[58] Field of Search ........................... 123/339.11, 339.16

[56] References Cited

U.S. PATENT DOCUMENTS

| | | |
|---|---|---|
| 4,071,002 | 1/1978 | Frahm . |
| 4,267,810 | 5/1981 | Wesemeuer et al. . |
| 4,429,671 | 2/1984 | Surace . |
| 4,580,221 | 4/1986 | Isobe et al. . |
| 5,012,779 | 5/1991 | Fukui et al. ........................ 123/339.19 |
| 5,107,815 | 4/1992 | Van Duyne . |
| 5,608,632 | 3/1997 | White . |

Primary Examiner—John Kwon
Attorney, Agent, or Firm—William D. Lanyi

[57] ABSTRACT

An engine control system digitally stores corresponding values of timing angles and engine speeds and selects the timing angles based on the operating speed of the engine. In the engine speed range near idle speed, the timing angle is set to a pre-selected angle after top dead center (ATDC) and the relationship between engine speed and timing angle calls for the timing angle to be advanced from the pre-selected angle after top dead center (ATDC) to successively advancing angles which subsequently increase angles before top dead center (BTDC) as the engine increases in speed. In one application, a timing angle of 10 degrees after top dead center (ATDC) is selected for a engine idle speed of approximately 800 RPM. This relationship, which is controlled by the engine control unit, avoids stalling the engine when an operator suddenly decreases the engine speed.

20 Claims, 5 Drawing Sheets

METHOD AND APPARATUS FOR CONTROLLING AN INTERNAL COMBUSTION ENGINE

BACKGROUND OF THE INVENTION

1. Field of the Invention

The present invention is generally related to the control of an internal combustion engine and, more particularly, to the control of a four cycle engine, wherein the timing of the engine is controlled as a function of the engine RPM and the timing is initially set to be controlled to a pre-selected angle after top dead center (ATDC) position of the piston when the engine is operating at idle speed under certain predetermined conditions.

2. Description of the Prior Art

Many different methods and apparatus are well known to those skilled in the art for controlling the operation of an internal combustion engine. Typically, a control procedure varies the timing of the engine as a predetermined function of a parameter such as engine speed, throttle position, load applied to the engine, etc.

U.S. Pat. No. 4,429,671, which issued to Surace on Feb. 7, 1984, discloses a device for automatically adjusting the rotational speed of an internal combustion engine when it is operating under idle conditions. The device automatically adjusts the spark advance for controlling the idling RPM of an internal combustion engine. It comprises a first sensor means connected by a first connection to the intake duct upstream of the throttle valve. The device also comprises a second connection to the duct downstream of the valve. The second connection is controlled by a solenoid valve that is, in turn, controlled by a second sensor means for determining the engine rotational speed. A third sensor means determines the throttle valve position.

U.S. Pat. No. 4,071,002, which issued to Frahm on Jan. 31, 1978, describes a throttle and ignition advance linkage for an internal combustion engine. A carburetor throttle valve of an internal combustion engine is set in timed relation to a timing control coil by a T-shaped throttle control level which is coupled to an external throttle operator and the timing control lever resiliently coupled to the throttle control lever. The two control levers are pivotally mounted on a common pivot pin secured to the engine block. The T-shaped throttle lever is pivotally mounted at the center of the cross-bar with a pair of throttle control cables that are secured to the opposite ends and to an external throttle control. The stem of the lever projects outwardly toward the carburetor valve input element. A cam member includes a slotted and clamp screw connection to one side of the stem to permit adjustment of the cam member along the length of the stem.

U.S. Pat. No. 4,267,810, which issued to Wesemeyer et al on May 19, 1981, discloses a control system for control of repetitive events such as ignition and fuel injection in internal combustion engines. In order to simplify the crankshaft rotation sensor device which provides the computer of a control system with angular speed and position information for ignition and/or fuel injection timing, a signal generated by one pickup for every two engine cylinders from a single reference mark on the crankshaft is formed into a signal pulse which is used to trigger the counting of clock pulses from a clock into a counter. These are then periodically transferred to a computer as a numerical signal which represents the required information. In a first mode, the counts are transferred every other period between pulses and the counter counts in the cycle periods between the pulses in which the counter is not transferring to the computer. In a second mode, the counter counts every cycle between pulses and the counts are transferred during every pulse itself. There is also described in this patent a system which includes additional circuitry by which below a certain speed of the engine the system operates in the first mode and above that speed operates in the second mode.

U.S. Pat. No. 5,107,815, which issued to Van Duyne on Apr. 28, 1992, describes a variable air/fuel engine control system with closed-loop control around a maximum efficiency and combination of otto-diesel throttling. The system is intended to control a spark ignition engine to maximize fuel efficiency over its entire range of operating conditions. The system includes apparatus for controlling the amount of fuel delivered to the engine and apparatus for measuring the internal cylinder pressure in at least one cylinder of the engine. Apparatus is provided for estimating the air mass entering the engine and computing apparatus calculates the engine efficiency from the amount of fuel delivered, internal cylinder pressure, and the estimated air mass entering the engine. In one embodiment, efficiency is measured by calculation of the approximate indicated specific fuel consumption. Apparatus is provided for varying the amount of fuel delivered to the engine to maximize the indicated specific fuel consumption over the entire range of operating conditions of the engine. In this embodiment, apparatus is provided which is responsive to a desired engine power output beyond wide open throttle plate and apparatus is provided for delivering a greater quantity of fuel beyond the wide open throttle plate position maximum efficiency point.

U.S. Pat. 5,608,632, which issued to White on Mar. 4, 1997, describes a self contained sequential throttle by injection engine control system. The system is configured to be attached to the intake port or intake manifold of a reciprocating engine. The system can be designed to allow installation as original equipment or as a retrofit unit. In either case, the system provides the engine with a dual ignition and electronically controlled fuel-injection. The system includes a master control unit that utilizes a firmware operating microprocessor. The control unit is connected to a plurality of sensors that sense critical system parameters that determine the engine settings. All systems parameters are user controlled by three system command switches that are located on a control display unit. The display unit is attached to the control unit by an electrical cable and is positioned on the vehicle to provide easy accessibility.

U.S. Pat. No. 4,580,221, which issued to Isobe et al on Apr. 1, 1986, discloses a method and device for internal combustion engine condition sensing and fuel injection control. Engine condition signals are read out from sensors for detecting conditions of the engine with selected sensor outputs read out in synchronism with rotation of the engine at a predetermined crank angle empirically corresponding to a low engine load and resulting high battery voltage. The predetermined crank angle is within at least 20 crank angle degrees of bottom dead center.

The above patents are hereby explicitly incorporated herein.

An operator who is controlling an internal combustion engine, such as the engine of an outboard motor, typically moves a throttle plate of the engine manually by adjusting a throttle handle to select engine speed. Using any one of many different known throttle controls, such as a tiller handle, an operator can continually move an adjustment device by hand and thereby, through a mechanical linkage, affect the position of a throttle plate located within an air intake assembly of the engine. By opening the throttle, engine speed is increased, and by closing the throttle, engine speed is decreased. In other words, the operator controls the speed of the engine by controlling the air flowing through the engine's intake manifold to its cylinders. When an operator suddenly changes engine speed from a first speed to a faster second speed, this results in two reactions in most internal combustion engines. First, the throttle valve is moved to a more open position. Secondly, and generally simultaneously, a quantity of fuel is injected by a fuel pump into the air stream passing from the air intake manifold to the cylinders of the engines. These two occurrences allow the engine to rapidly respond to the operator's manual request for increased speed.

If, after increasing the speed of an engine, the operator then suddenly decreases the speed, the engine may react in a manner that is not intended. For example, an increase in speed followed by a sudden decrease in speed can result in too much fuel passing into the cylinders. As described above, the initial increase in speed results in an injection of fuel into the air stream by a fuel pump. If the speed is then suddenly reduced before that injected fuel is consumed, the cylinders of the engine will experience a condition wherein a higher than normal quantity of fuel flows into the cylinders is accompanied by a lower than normal quantity of air. This condition could result in stalling.

In order to avoid the situation described immediately above, many throttle controls are provided with a dashpot which ameliorates the action by the operator described above. In other words, when the operator attempts to suddenly open the throttle and then quickly close the throttle, the dashpot mechanically delays the response by the throttle. In other words, the throttle plate closes in response to the operator's control, but in a manner slower than the actual manual change in the control device, such as the tiller handle. The dashpot moderates the movement of the throttle plate so that it does not rapidly close and deprive the cylinders of the required air to burn the fuel that had been injected as a result of the sudden increase in speed caused by the operator. This delayed closing of the throttle plate allows the excess fuel to be burned because the speed of the engine is decreased more slowly than requested by the operator.

Many different types of dashpots are well known to those skilled in the art. However, the inclusion of the dashpot on an internal combustion engine adds cost and complexity. It would therefore be significantly beneficial if a means could be provided to prevent the adverse results described above, when an operator suddenly increases and subsequently quickly decreases engine speed, but without the need for the additional cost and complexity associated with a provision of a dashpot.

SUMMARY OF THE INVENTION

The present invention, in a preferred embodiment, comprises at least one cylinder in which a piston is disposed for reciprocating motion therein and a spark plug is configured to fire an igniting spark within a combustion chamber of the cylinder. A tachometer is provided for measuring the speed of the engine. The tachometer can be of any type or structure which is capable of providing a measurement of the rotational or operational speed of the crankshaft of the engine. A control unit is provided for controlling the timing of the igniting spark of the spark plug relative to the position of the piston within the cylinder. The control unit is programmed to control the timing as a predetermined function of the engine speed. The engine has an air intake conduit for providing air to the cylinders. In addition, a throttle is provided and disposed within the air intake conduit of the engine for controlling the flow of air to the cylinder. The control unit is programmed to control the timing of the igniting spark at a preselected idle engine speed to a preselected angle of the crankshaft after the piston has reached its top dead center (TDC) position within the cylinder. The throttle is set at a position which achieves the preselected idle engine speed under preselected conditions. Nominally, the preselected idle engine speed is 800 RPM. However, a tolerance is typically used wherein the pre-selected idle engine speed can be between 775 RPM and 825 RPM.

The preselected angle of the crankshaft can be between 5 and 15 degrees after the piston is at its top dead center position within the cylinder. Nominally, the preselected angle of the crankshaft is set to 10 degrees after top dead center (ATDC), but it is recognized that some variation on this timing setting for idle speed can be required for certain types of internal combustion engines. In selecting the preselected angle of the crankshaft, a tolerance is typically applied and the angle can be between 8 and 12 degrees after top dead center (ATDC), between 5 and 15 degrees after top dead center (ATDC), or any other selected range after top dead center (ATDC).

As described above, the preselected angle of the crankshaft after the piston is at its top dead center position within the cylinder is combined, in a preferred embodiment of the present invention, with the throttle being set at a position which achieves the preselected idle engine speed under the preselected conditions. In applications where the engine is included as a part of an outboard motor, the preselected conditions comprise the outboard motor being in gear with a propeller of the outboard motor being submerged in water.

BRIEF DESCRIPTION OF THE DRAWINGS

The present invention will be more fully and completely understood from a reading of the description of the preferred embodiment in conjunction with the drawings, in which.

DESCRIPTION OF THE PREFERRED EMBODIMENT

Throughout the description of the preferred embodiment, like components will be identified by like reference numerals.

Figure 1:
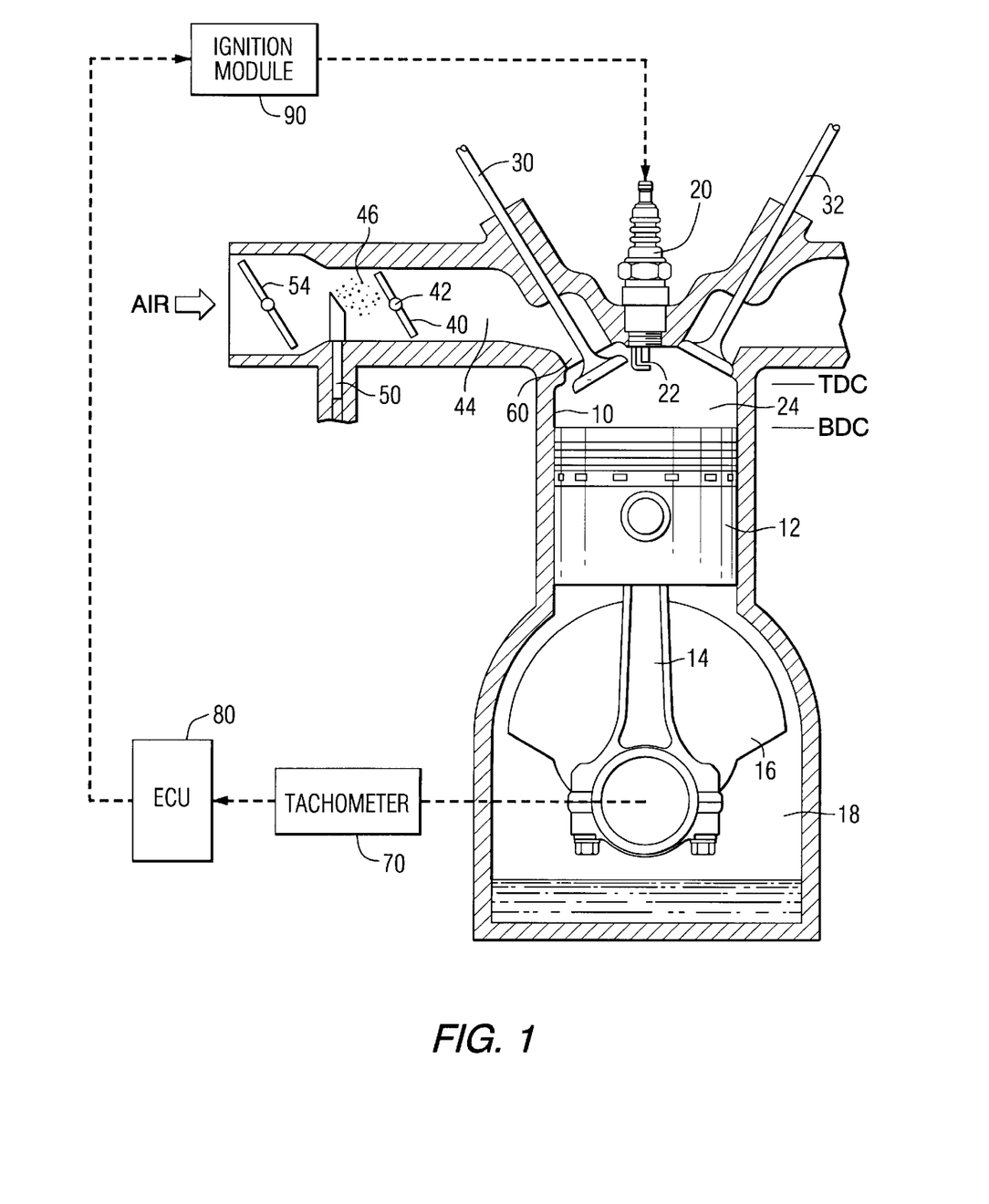
FIG. 1 is a schematic representation of a cylinder in an internal combustion engine.

FIG. 1 shows an exemplary, but highly simplified, schematic of a four cycle internal combustion engine. Although only one cylinder 10 is shown, it should be understood that in most applications of internal combustion engines, a plurality of cylinders 10 are typically used.

Within the cylinder 10 of FIG. 1, a piston 12 is disposed for reciprocating movement therein. The piston 12 is attached to a connecting rod 14 which, in turn, is attached to a crankshaft 16. The crankshaft rotates about an axis within a crankcase 18 and this rotational movement causes the connecting rod 14 to move the piston 12 back and forth within the cylinder 10 between two limits of travel. The position shown in FIG. 1 represents the piston 12 at its bottom dead center (BDC) position within the cylinder 10. After the crankshaft 16 rotates 180 degrees about its axis, the piston 12 will move to its uppermost position at top dead center (TDC). A sparkplug 20 is configured to provide an igniting spark at its tip 22 to ignite a mixture of fuel and air within the combustion chamber 24.

An intake valve 30 and an exhaust valve 32 are shown, with the intake valve 30 being shown in an opened position and the exhaust valve 32 being shown in a closed position. A throttle 40 is pivotable about point 42 to regulate the flow of air through an air intake conduit 44 of the engine. Fuel 46 is introduced into the air intake conduit 44, in the form of a mist, through tube 50. In certain applications, a choke 54 is located upstream from the throttle 40.

During operation of the engine shown in FIG. 1, air flows through the air intake conduit 44 under the control of a throttle 40. Fuel 46 is introduced into the air stream as a mist and passes with the air through the intake port 60 which conducts the fuel/air mixture into the combustion chamber 24. The timing of the engine determines the point, relative to the rotation of the crankshaft 16, when the sparkplug 20 is fired to ignite the fuel/air mixture within the combustion chamber 24. If the sparkplug 20 fires before the piston 12 reaches its uppermost position within cylinder 10, it is referred to as being fired before top dead center (BTDC). If the sparkplug 20 is fired when the piston 12 is on its way down from its uppermost position in FIG. 1, it is referred to as being fired after top dead center (ATDC). In most applications of internal combustion engines, the timing is set to fire the sparkplug 20 at some crank angle before top dead center (BTDC). The crankshaft 16 rotates through 360 degrees of rotation as the piston 12 moves through its entire reciprocating motion. It is typical to refer to the timing of an engine in terms of the crank angle before top dead center (BTDC) or after top dead center (ATDC), with reference to the position of the piston 12 when the igniting spark is provided at the tip 22 of the spark plug 20.

With continued reference to FIG. 1, the tachometer 70 is shown schematically connected in signal communication with the crankshaft 16 or some other device, such as gear tooth wheel, connected to the crankshaft to allow its rotational speed to be measured. This information from the tachometer 70 is provided to the engine control unit (ECU) 80. In a typical application, the engine control unit comprises a microprocessor that digitally stores information necessary to allow the engine control unit to control the timing of the engine. A signal is sent from the engine control unit 80 to an ignition module 90 or some other suitable device to cause the sparkplug 20 to fire. It should be understood that FIG. 1 is highly simplified for purposes of clarity and to permit the general operation of the internal combustion engine to be described.

The throttle 40 in FIG. 1 is typically caused to pivot about its center of rotation 42 by mechanical movement of the throttle 40 in response to an operator command. For example, with internal combustion engines used in conjunction with outboard motors, the throttle 40 is caused to pivot about point 42 in response to an operator rotating a tiller handle grip. Alternatively, the throttle 40 can be controlled by other types of throttle handles. In most applications, the throttle 40 can be moved from an open position to a closed position where the air passing through the air intake conduit 44 is virtually stopped. However, it should be understood that in most applications of internal combustion engines, means is generally provided to allow a small amount of air to bypass the plate of the throttle 40 during idle engine speed conditions in order to allow the engine to continue to operate, although at a significantly reduced speed. This reduced flow of air can be provided by small holes formed through the throttle plate 40 or other bypass channels formed in the structure of the air intake conduit 44. It should be understood that movement of the throttle plate 40 from a closed position to an open position increases the operational speed of the engine and movement of the throttle plate 44 from an open position to a closed position reduces the operational speed of the engine.

Figure 2:
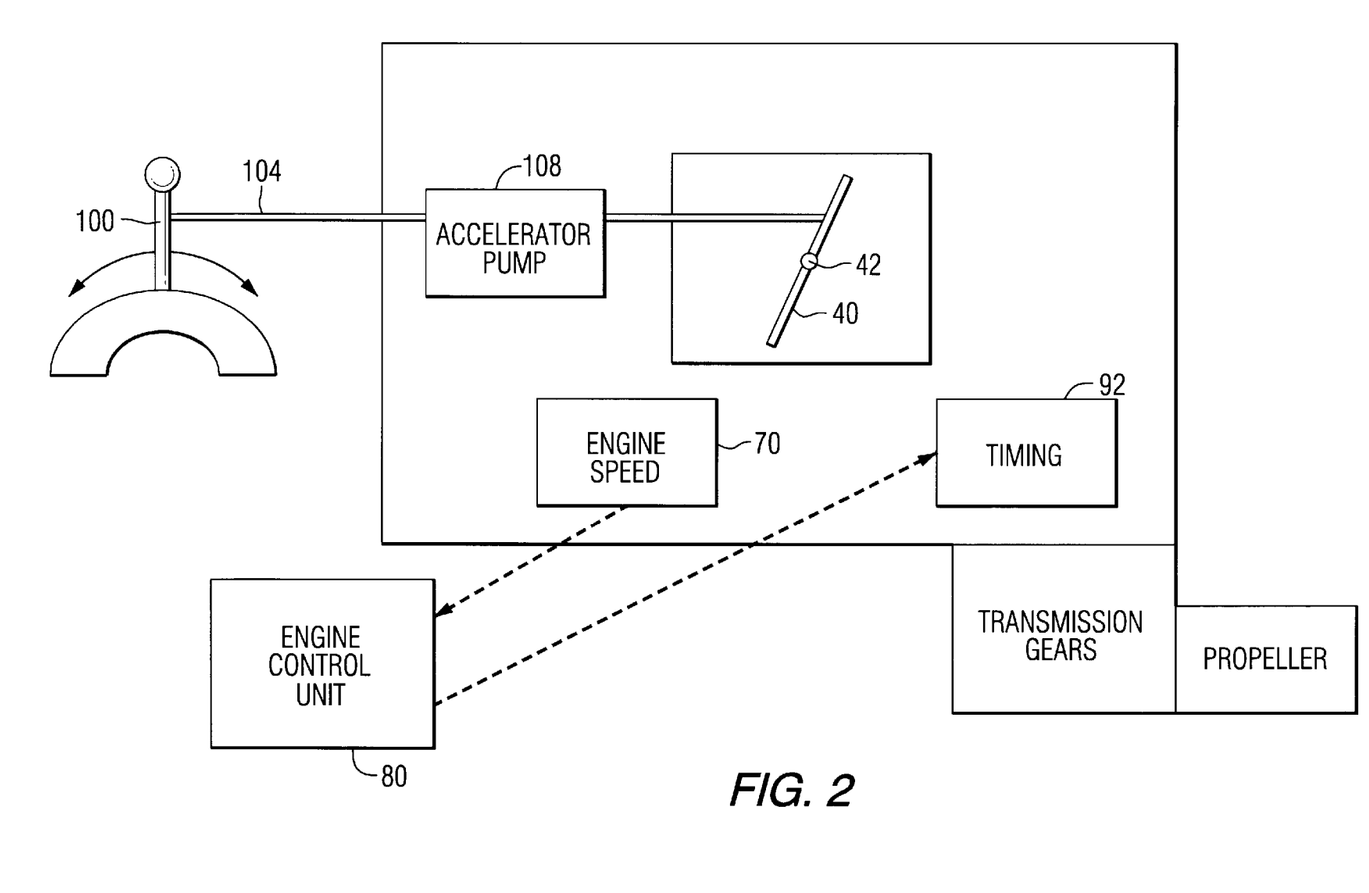
FIG. 2 is a schematic representation of a manual engine control system in combination with an engine control unit.

FIG. 2 is a highly simplified schematic of an engine control system. When an operator moves a throttle control handle 100, a direct mechanical linkage 104 typically causes the throttle 40 to pivot about point 42. The linkage 104 can comprise a series of levers or a combination of cables and levers. In the application shown in FIG. 2, the linkage 104 also controls an accelerator pump 108 which causes fuel to be introduced into the air intake conduit 44 of the engine. Therefore, if the operator moves handle 100 to increase the speed of the engine, two reactions occur. First, the throttle 40 pivots about point 42 in response to the movement of the handle 100. Also, in a synchronized manner, the accelerator pump 108 is caused to introduce a mist of fuel 46 into the air stream passing through the air intake conduit 44.

The engine control unit 80 receives signals from a tachometer 70 that measures engine speed and provides output signals to a timing system 92 which can comprise the ignition module 90 and sparkplug 20 described above. In a typical application, the engine control unit 80 comprises stored data, in a digital form, which provides a desired corresponding crankshaft angle for each incremental change in the rotational speed of the engine. In other words, after receiving the rotational speed of the engine from a tachometer or other suitable device, the engine control unit 80 selects a crankshaft angle at which the sparkplug 20 should be fired. The crankshaft angle, for each incremental rotational speed, is stored in a microprocessor of the engine control unit 80 and represents the desired time, relative to piston position, that the sparkplug 20 should be fired. In many applications of engine control units, a finite number of representative rotational speeds are stored digitally within the microprocessor memory and intermediate speeds are determined by interpolation. This interpolated engine speed is used to select the associated crankshaft angle. This information is then provided to a timing system 92 which executes the commands provided by the engine control unit 80.

Figure 3:
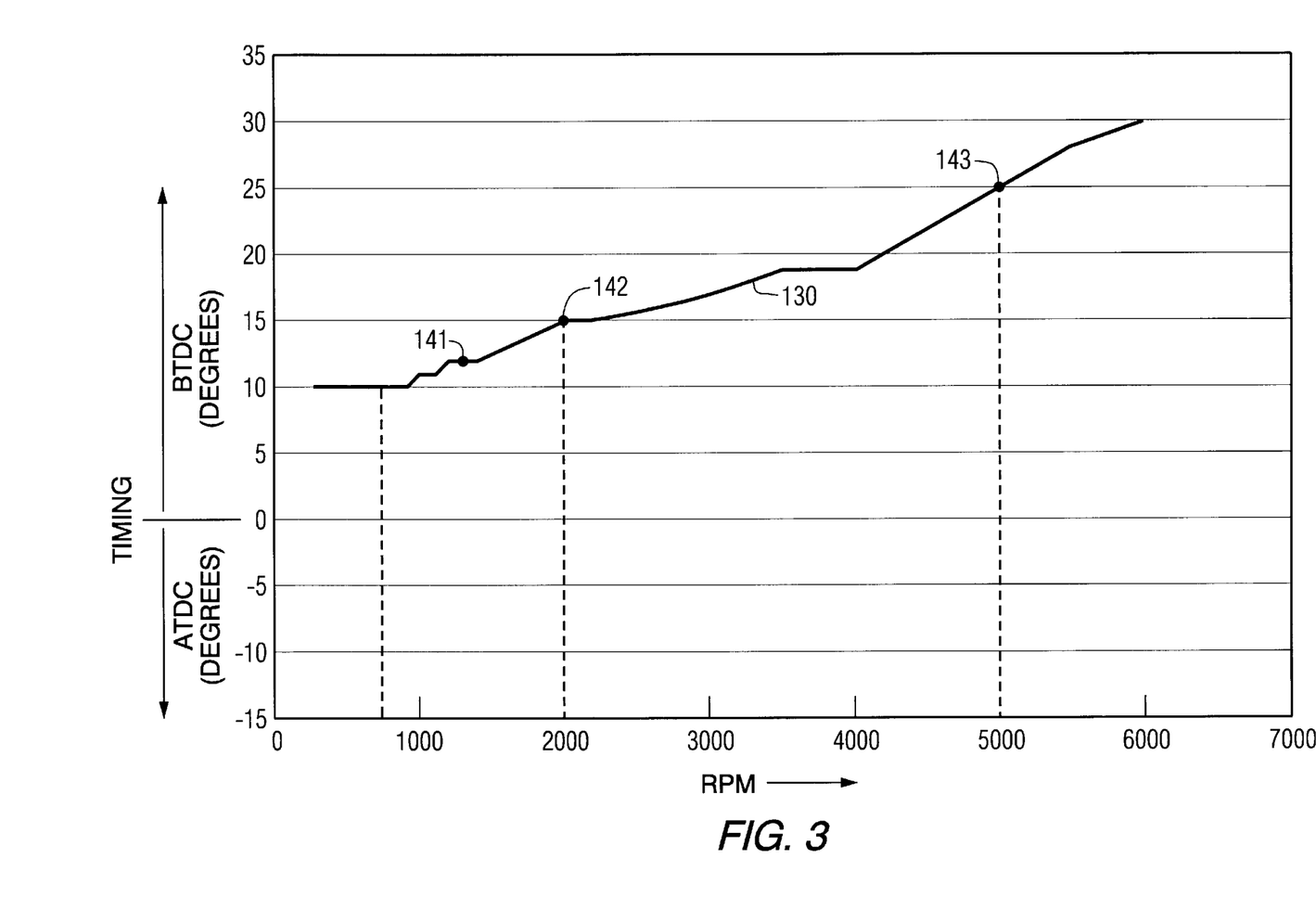
FIG. 3 shows a typical relationship between engine speed and timing angle for known engine control systems.

FIG. 3 is a graphical representation of a map that provides a desired timing angle as a function of engine speed measured in RPM. For example, if the engine control unit 80 receives a signal that the engine is operating at 2000 RPM, the engine control unit 80 would provide the appropriate command to the timing system 92 to set the timing to be 15 degrees before top dead center (BTDC). Alternatively, if the engine control unit 80 senses that the engine is operating at 5000 RPM, it would command a firing angle of 25 degrees before top dead center (BTDC).

In FIG. 3, it can be seen that an idle engine speed of approximately 800 RPM would result in the engine control unit 80 commanding a timing angle of 10 degrees before top dead center (BTDC). The graphical relationship represented by line 130 in FIG. 3 represents all of the timing angles for a range of speeds between 300 RPM and 6000 RPM. In one particular application, the line 130 in FIG. 3 is represented by 23 distinct points, or speeds, for which a corresponding crankshaft angle is stored. For engine speeds between the distinct stored points, a microprocessor can easily interpolate an appropriate timing angle from the curve 130. For the purpose of illustrating one possible deleterious result that can occur in known engine control systems, two exemplary points are provided in FIG. 3. The first point 141 represents the timing angle for an engine speed of approximately 1300 RPM. A second point 142 represents the appropriate timing angle for a speed of 2000 RPM. If an operator suddenly changes the speed of the engine from 1300 RPM to 2000 RPM, the engine throttle plate 40 will be suddenly opened by the mechanical linkage between the control handle 100 and the throttle plate 40. In addition, the accelerator pump 108 will cause additional fuel to be introduced into the air stream within the air intake conduit 44. If the operator suddenly reverses the throttle, to quickly drop the engine speed from 2000 RPM at point 142 to 1300 RPM at point 141, the additional fuel in the air stream may not be burned satisfactorily because the throttle 40 is suddenly moved in a direction toward reducing the air flow through the air intake conduit 44. In order to prevent this situation from occurring, most engines apply a dashpot to the throttle control linkage to slow its movement when the operator attempts to change the speed from point 142 to point 141 as described above.

Figure 4:
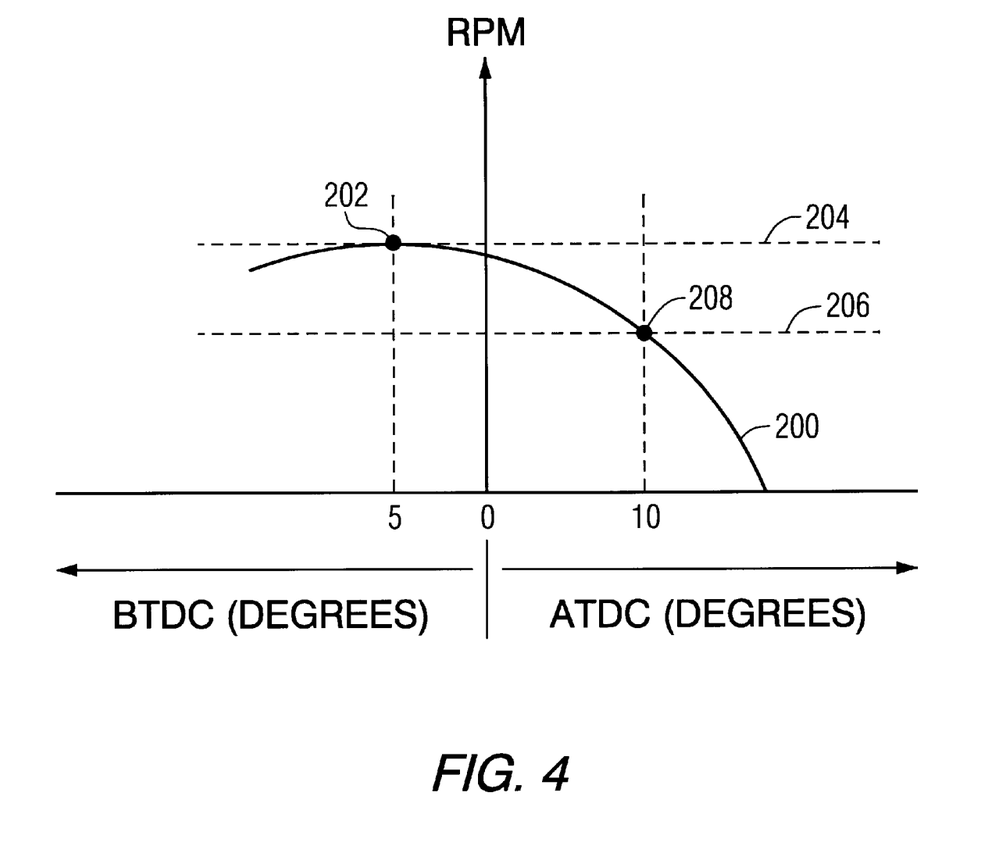
FIG. 4 shows the relationship between timing angle and engine speed for a given throttle position.

Before describing the specific details of the present invention, it is important to note that for any fixed throttle position, changing the timing angle will affect the RPM of the engine. FIG. 4 represents this relationship graphically. Line 200 shows an exemplary relationship between timing angle and RPM for a given throttle position. As an example, if the timing is set to 5 degrees before top dead center (BTDC), the engine operates at point 202 for a fixed throttle 40 position. If, without changing the throttle position, the timing is changed to 10 degrees after top dead center (ATDC), the RPM will drop from the level represented by line 204 to the level represented by line 206 and point 208. Therefore, it can be seen that the engine speed can be significantly changed by simply changing the timing angle without changing the throttle position.

An engine control system, in accordance with the preferred embodiment of the present invention, incorporates two associated changes to known control systems. One change relates to the throttle position and timing angle at an idle speed for the engine. A second condition relates to the stored relationship between engine speed and timing angle which is typically contained within a microprocessor memory unit of an engine control unit 80. For purposes of this description, it will be assumed that a typical timing/throttle relationship for a four cycle engine is that at an idle engine speed the firing angle is set at approximately 10 degrees before top dead center (BTDC) and the throttle plate 40 is essentially closed to minimize the air flowing through the air intake conduit 44. This relationship would typically be achieved during setup of the engine where memory of the engine control unit 80 would be configured to provide a firing angle of 10 degrees before top dead center (BTDC) at an idle speed of approximately 800 RPM. Then, the throttle 40 would be mechanically adjusted to achieve an engine speed of approximately 800 RPM. In most applications, in view of the relationship represented in FIG. 4, the throttle plate would be virtually closed to achieve the idle speed. This results from the fact that a timing setting before top dead center (BTDC) tends to maximize the RPM for any given throttle 40 position.

In conjunction with a standard setup as described above, a relationship such as that represented in FIG. 3 would be digitally stored in the microprocessor memory. The relationship shown in FIG. 3 calls for a timing angle of 10 degrees before top dead center (BTDC) at an idle speed at approximately 800 RPM. It should be understood that the timing angle of 10 degrees before top dead center (BTDC) shown in FIG. 3 is not necessary in all control systems for all engines. Other angles before top dead center could also be selected. However, most engine control schemes known to those skilled in the art provide for an idle speed setting of some positive angle before top dead center (BTDC). As represented by line 130 in FIG. 3, that timing angle is then advanced in response to increasing engine speed.

Figure 5:
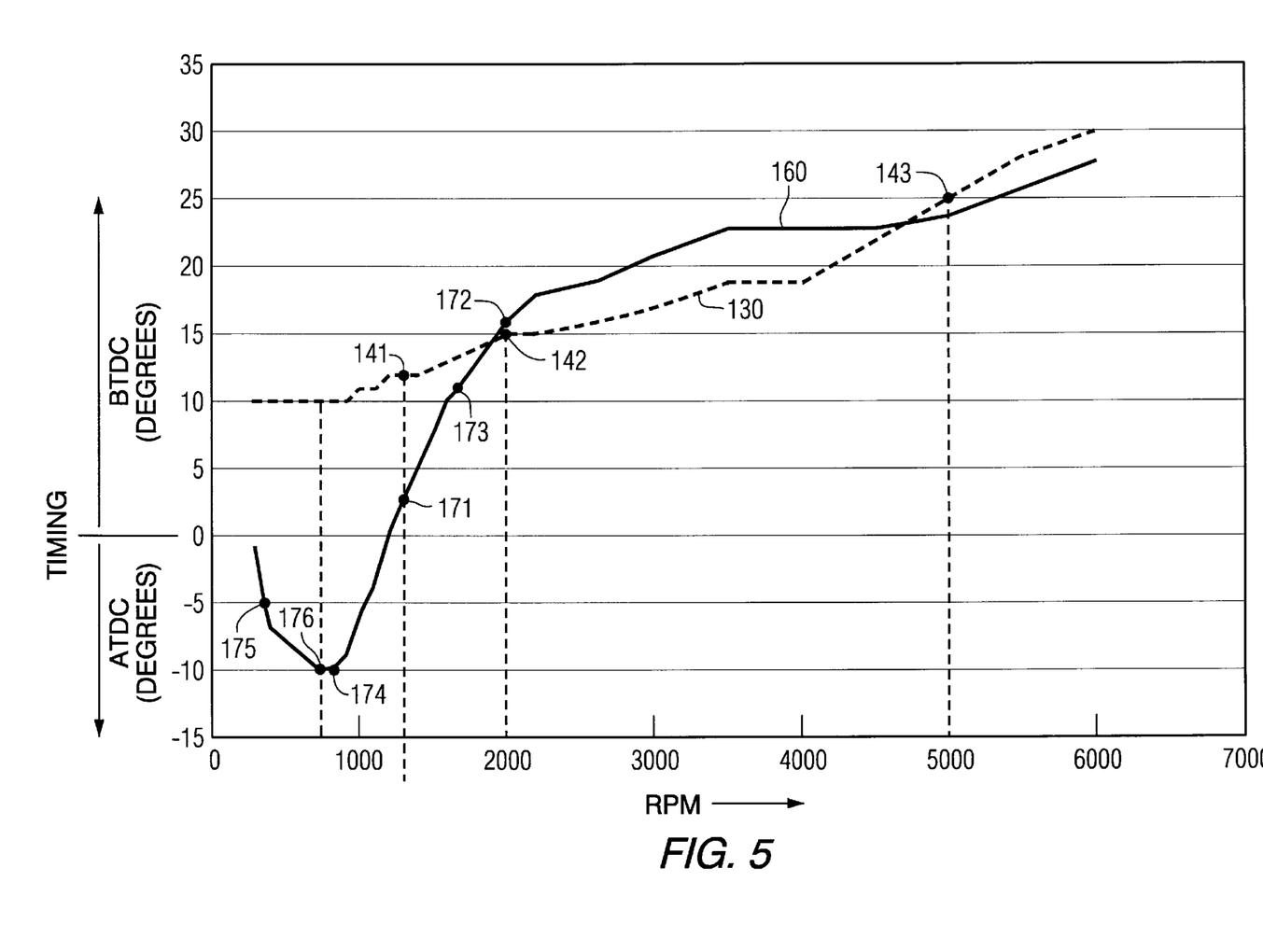
FIG. 5 shows the relationship between engine speed and timing angle for both the present invention and the known relationship illustrated in FIG. 3.

FIG. 5 graphically represents the relationship 160 between timing angle and engine speed for a control system made in accordance with the present invention. For purposes of comparison, line 130 from FIG. 3 is also included as a dashed line in FIG. 5. The differences in the relationships represented by line 130 and line 160 are apparent in FIG. 5. Line 160 represents the relationship between engine speed and timing angle under the control of an engine control unit and a control system made in accordance with the present invention. Line 130 represents the corresponding relationship between engine speed and timing angle for a known engine control system.

With continued reference to FIG. 5, it can be seen that at an idle engine speed of approximately 800 RPM, the present invention selects a timing angle of 10 degrees after top dead center (ATDC). The known system represented by line 130 selects a timing angle of 10 degrees before top dead center (BTDC) for the same engine idle speed of approximately 800 RPM. It can also be seen that the present invention selects timing angles after top dead center (ATDC) for all speeds below proximately 1200 RPM. The idle engine speed conditions are set, in an application wherein the engine is used as the propulsion device for an outboard motor, by placing the outboard motor in gear with the propeller submerged under water. With the engine running in gear, the throttle plate 40 is set to a position that results in the desired idle speed of approximately 800 RPM. The engine control unit has been pre-programmed to select a timing angle of 10 degrees after top dead center (ATDC) for this speed. It should be understood that the idle speed of 800 RPM is typically set with an allowed tolerance band. In other words, the idle speed would be set by adjusting the throttle linkage until the engine speed reaches a magnitude within an acceptable tolerance, such as 775 RPM to 825 RPM, 700 RPM to 900 RPM, etc. It should be understood that the magnitude of the tolerance for setting the idle speed is not limiting to the present invention.

In conjunction with FIG. 5, the engine control system response to the operator's sudden increase and subsequent decrease in engine speed will be described. If the engine is operating at approximately 1300 RPM as represented by point 171 in FIG. 5 and the operator quickly requests an engine speed of 2000 RPM as represented by point 172, the throttle plate will be quickly opened by the linkage connected to the operator's control handle and fuel will be introduced by a fuel pump into the air intake conduit. This quickly increases the RPM to approximately 2000 as represented by point 172. If the operator then abruptly decreases the speed request, by twisting the handle grip of a tiller handle or moving a throttle handle suddenly towards the idle position, the engine speed will quickly begin to decrease. When it reaches point 173, the engine control system of the present invention will respond by setting a timing angle slightly higher than 10 degrees before top dead center (BRDC). As the engine speed continues to decrease, to point 174, the engine control system of the present invention will continue to respond to the decreasing RPM by further decreasing the timing angle from slightly greater than 10 degrees before top dead center (BTDC) to an angle of approximately 10 degrees after top dead center (ATDC). As the engine speed continues to decrease, to point 175, the engine control system will begin to advance the timing by decreasing the magnitude of the angle after top dead center (ATDC). This timing advance assists the engine in burning the excess fuel that had been introduced by the fuel pump into the air intake conduit. As this occurs, the engine RPM will automatically increase from point 175 to point 176 and the engine control system will respond by setting the timing to the pre-selected crankshaft angle of 10 degrees after top dead center (ATDC).

In essence, the present invention differs from the prior art in two significant ways. First, the timing angle at the engine idle speed setting is set to a crankshaft angle after top dead center (ATDC) whereas the prior art systems typical set the idle speed timing angle to some crankshaft angle before top dead center (BTDC). In addition, the relationship between the timing angle and the engine speed initially decreases as the engine changes from high speeds to low speeds as represented in FIG. 5 between engine speeds 6000 and 800, and then increases as the engine speed drops below idle speed (i.e. below 800 RPM in FIG. 5). These two differences between the control system of the present invention and the known control systems in the prior art result in a significant advantage of allowing the engine to recover from sudden increases in speed followed by sudden decreases in speed without stalling and without the need for a mechanical dashpot connected to the throttle mechanism in order to prevent the operator from suddenly closing the throttle 40.

Although the present invention has been described with particular specificity and illustrated to show one preferred embodiment of the present invention, it should be understood that alternative embodiments are also within its scope. For example, the idle speed of the engine, as is relevant to the engine control system, need not be set at 800 RPM. Other idle speeds are also within the scope of the present invention. Similarly, the allowed tolerance band relating to the engine speed can be plus or minus 25 RPM, plus or minus 50 RPM, or any other tolerance band that is suitable for a particular application. It should also be understood that the idle timing setting of 10 degrees after top dead center (ATDC) is not precisely limiting to the present invention. Other crankshaft angle timing settings after top dead center (ATDC) are also within the scope of the present invention.

We claim:

1. A four cycle internal combustion engine, comprising:

at least one cylinder in which a piston is disposed for reciprocating motion therein and a sparkplug is configured to fire an igniting spark;

a tachometer for measuring the speed of said engine;

a control unit for controlling the timing of said igniting spark relative to the position of said piston in said cylinder, said control unit being programmed to control said timing as a predetermined function of said engine speed;

an air intake conduit for providing air to said cylinder; and a throttle disposed within said air intake conduit for limiting the flow of air to said cylinder, said control unit being programmed to control said timing at a preselected idle engine speed to a preselected angle of said crankshaft after said piston is at its top dead center position within said cylinder and said throttle being set at a position which achieves said preselected idle engine speed under preselected conditions.

2. The engine of claim 1, wherein:

said preselected idle engine speed is between 775 rpm and 825 rpm.

3. The engine of claim 1, wherein:

said preselected angle of said crankshaft is between five and fifteen degrees after said piston is at its top dead center within said cylinder.

4. The engine of claim 3, wherein:

said preselected angle of said crankshaft is between eight and twelve degrees after said piston is at its top dead center position within said cylinder.

5. The engine of claim 1, wherein:

wherein said engine is incorporated within an outboard motor.

6. The engine of claim 5, wherein:

said preselected conditions comprise the outboard motor being in gear with a propeller of said outboard motor being submerged in water.

7. The engine of claim 1, wherein:

said control unit comprises a microprocessor.

8. An engine of an outboard motor, comprising:

at least one cylinder formed in an engine block of said engine;

a piston disposed for reciprocating motion within said cylinder;

a sparkplug partially disposed within said cylinder and configured to fire an igniting spark within an ignition chamber of said cylinder;

a tachometer for measuring the speed of said engine;

an engine control unit for controlling the timing of said igniting spark relative to the position of said piston in said cylinder, said engine control unit being programmed to control said timing as a predetermined function of said engine speed;

an air intake conduit for providing air to said cylinder; and a throttle plate disposed within said air intake conduit for limiting the flow of air to said cylinder, said engine control unit being programmed to control said timing at a preselected idle engine speed to a preselected angle of said crankshaft after said piston is at its top dead center position within said cylinder and said throttle plate being set at a position which achieves said preselected idle engine speed under preselected conditions.

9. The engine of claim 8, wherein:

said preselected idle engine speed is between 700 rpm and 900 rpm.

10. The engine of claim 8, wherein:

said preselected angle of said crankshaft is between two and eighteen degrees after said piston is at its top dead center within said cylinder.

11. The engine of claim 10, wherein:

said preselected angle of said crankshaft is between eight and twelve degrees after said piston is at its top dead center position within said cylinder.

12. The engine of claim 8, wherein:

wherein said engine incorporated within an outboard motor.

13. The engine of claim 12, wherein:

said preselected conditions comprise the outboard motor being in gear with a propeller of said outboard motor being submerged in water.

14. A method for controlling the operation of an internal combustion engine of an outboard motor, comprising:

measuring the speed of said engine;

controlling the timing of an igniting spark from a sparkplug relative to the position of a reciprocating piston in a cylinder of said engine, said controlling step being performed as a predetermined function of said engine speed; and wherein said timing is controlled by said controlling step, at a preselected idle engine speed of said engine, to be a preselected angle of a crankshaft of said engine after said piston is at its top dead center position within said cylinder and a throttle plate in an air intake of said engine is set at a position which achieves said preselected idle engine speed under preselected conditions.

15. The method of claim 14, wherein:

said predetermined function of said engine speed comprises a table of associated speed magnitudes and timing magnitudes.

16. The method of claim 14, wherein:

said preselected angle of said crankshaft of said engine after said piston is at its top dead center position within said cylinder is between seven degrees and thirteen degrees.

17. The method of claim 14, wherein:

said preselected conditions comprise said outboard motor being in gear with a propeller of said outboard motor being submerged in water.

18. The method of claim 17, wherein:

said preselected idle engine speed is between 775 rpm and 825 rpm.

19. The method of claim 14, wherein:

said controlling step is performed by a microprocessor.

20. The method of claim 14, wherein:

said engine is a four cycle engine.

* * * * *